United States Patent
Hare et al.

(10) Patent No.: US 9,857,876 B2
(45) Date of Patent: Jan. 2, 2018

(54) NON-LINEAR MOTION CAPTURE USING FRENET-SERRET FRAMES

(71) Applicant: Leap Motion, Inc., San Francisco, CA (US)

(72) Inventors: Gabriel A Hare, Daly City, CA (US);
Keith Mertens, Oakland, CA (US);
Matias Perez, San Francisco, CA (US);
Neeloy Roy, San Francisco, CA (US);
David Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 41 days.

(21) Appl. No.: 14/338,136

(22) Filed: Jul. 22, 2014

(65) Prior Publication Data
US 2015/0022447 A1    Jan. 22, 2015

Related U.S. Application Data

(60) Provisional application No. 61/856,976, filed on Jul. 22, 2013.

(51) Int. Cl.
*G06F 3/03*     (2006.01)
*G06F 3/01*     (2006.01)

(52) U.S. Cl.
CPC ............ *G06F 3/017* (2013.01); *G06F 3/0304* (2013.01)

(58) Field of Classification Search
CPC .............................. G06F 3/0304; G06F 3/017
See application file for complete search history.

(56) References Cited

U.S. PATENT DOCUMENTS

| | | | | |
|---|---|---|---|---|
| 6,795,068 B1* | 9/2004 | Marks | ................... | G06F 3/0304 345/419 |
| 8,854,433 B1* | 10/2014 | Rafii | ....................... | G06F 3/017 348/42 |
| 2010/0295849 A1* | 11/2010 | Chai | ....................... | G06T 17/20 345/420 |
| 2011/0110560 A1* | 5/2011 | Adhikari | .................. | G06F 3/017 382/103 |
| 2012/0036433 A1* | 2/2012 | Zimmer | .................. | G06T 15/20 715/702 |
| 2014/0152551 A1* | 6/2014 | Mueller | .................. | G06F 3/017 345/156 |
| 2014/0201666 A1* | 7/2014 | Bedikian | ................. | G06F 3/017 715/771 |

* cited by examiner

*Primary Examiner* — Charles Hicks
(74) *Attorney, Agent, or Firm* — Haynes Beffel & Wolfeld LLP; Ernest J. Beffel, Jr.

(57) ABSTRACT

Implementations of the technology disclosed convert captured motion from Cartesian/(x,y,z) space to Frenet-Serret frame space, apply one or more filters to the motion in Frenet-Serret space, and output data (for display or control) in a desired coordinate space—e.g., in a Cartesian/(x,y,z) reference frame. The output data can better represent a user's actual motion or intended motion.

17 Claims, 6 Drawing Sheets

NON-LINEAR MOTION CAPTURE USING FRENET-SERRET FRAMES

PRIORITY AND RELATED STATEMENT

This application claims the benefit of U.S. Provisional Patent Application No. 61/856,976, entitled, "FILTERING MOTION USING FRENET-SERRET FRAMES," filed on Jul. 22, 2013 . The provisional application is hereby incorporated by reference for all purposes.

FIELD OF THE TECHNOLOGY DISCLOSED

The technology disclosed relates generally to motion capture and in particular to capturing motion information of objects during curvilinear free-form gestures.

INCORPORATIONS

Materials incorporated by reference in this filing include the following:

"DETERMINING POSITIONAL INFORMATION FOR AN OBJECT IN SPACE", U.S. Non. Prov. application Ser. No. 14/214,605, filed 14 Mar. 2014 , "RESOURCE-RESPONSIVE MOTION CAPTURE", U.S. Non. Prov. application Ser. No. 14/214,569, filed 14 Mar. 2014 , "PREDICTIVE INFORMATION FOR FREE SPACE GESTURE CONTROL AND COMMUNICATION", U.S. Prov. App. No. 61/873,758, filed 4 Sep. 2013 , "VELOCITY FIELD INTERACTION FOR FREE SPACE GESTURE INTERFACE AND CONTROL", U.S. Prov. App. No. 61/891,880, filed 16 Oct. 2013 , "INTERACTIVE TRAINING RECOGNITION OF FREE SPACE GESTURES FOR INTERFACE AND CONTROL", U.S. Prov. App. No. 61/872,538, filed 30 Aug. 2013 , "DRIFT CANCELLATION FOR PORTABLE OBJECT DETECTION AND TRACKING", U.S. Prov. App. No. 61/938,635, filed 11 Feb. 2014 , "IMPROVED SAFETY FOR WEARABLE VIRTUAL REALITY DEVICES VIA OBJECT DETECTION AND TRACKING", U.S. Prov. App. No. 61/981,162, filed 17 Apr. 2014 , "WEARABLE AUGMENTED REALITY DEVICES WITH OBJECT DETECTION AND TRACKING", U.S. Prov. App. No. 62/001,044, filed 20 May 2014 , "METHODS AND SYSTEMS FOR IDENTIFYING POSITION AND SHAPE OF OBJECTS IN THREE-DIMENSIONAL SPACE", U.S. Prov. App. No. 61/587,554, filed 17 Jan. 2012, "SYSTEMS AND METHODS FOR CAPTURING MOTION IN THREE-DIMENSIONAL SPACE", U.S. Prov. App. No. 61/724,091, filed 8 Nov. 2012, "NON-TACTILE INTERFACE SYSTEMS AND METHODS", U.S. Prov. App. No. 61/816,487, filed 26 Apr. 2013 , "DYNAMIC USER INTERACTIONS FOR DISPLAY CONTROL", U.S. Prov. App. No. 61/752,725, filed 15 Jan. 2013, "VEHICLE MOTION SENSORY CONTROL", U.S. Prov. App. No. 62/005,981, filed 30 May 2014, "MOTION CAPTURE USING CROSS-SECTIONS OF AN OBJECT", U.S. application Ser. No. 13/414,485, filed 7 Mar. 2012, and "SYSTEM AND METHODS FOR CAPTURING MOTION IN THREE-DIMENSIONAL SPACE", U.S. application Ser. No. 13/742,953, filed 16 Jan. 2013.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The term "motion capture" refers generally to processes that capture movement of a real-world subject in three-dimensional (3D) space and translate that movement into, for example, a digital model or other computer-based representation. Motion capture often involves recognizing and tracking the intentional movement of a user's hand, body, or any other object as it performs a gesture, which can be interpreted by an electronic device as user input or a command.

Most existing motion-capture systems rely on markers or sensors worn by the subject while executing the motion and/or on the strategic placement of numerous cameras in the environment to capture images of the moving subject from different angles. Such systems tend to be expensive to construct. In addition, markers or sensors worn by the subject can be cumbersome and interfere with the subject's natural movement. Further, systems involving large numbers of cameras tend not to operate in real time, due to the volume of data that needs to be analyzed and correlated. Such considerations of cost, complexity and convenience have limited the deployment and use of motion-capture technology.

Consequently, there is a need for an economical approach that captures the motion of objects in real time without attaching sensors or markers thereto.

SUMMARY

Implementations of the technology disclosed convert captured motion from Cartesian/(x,y,z) space to Frenet-Serret frame space, apply one or more filters to the motion in Frenet-Serret space, and output data (for display or control) in a desired coordinate space—e.g., in a Cartesian/(x,y,z) reference frame. The output data can better represent a user's actual motion or intended motion.

Advantageously, some implementations can provide for improved interface with computing and/or other machinery than would be possible with heretofore known techniques. In some implementations, a richer human-machine interface experience can be provided. The following detailed description together with the accompanying drawings will provide a better understanding of the nature and advantages provided for by implementations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

Introduction

Figure 1:
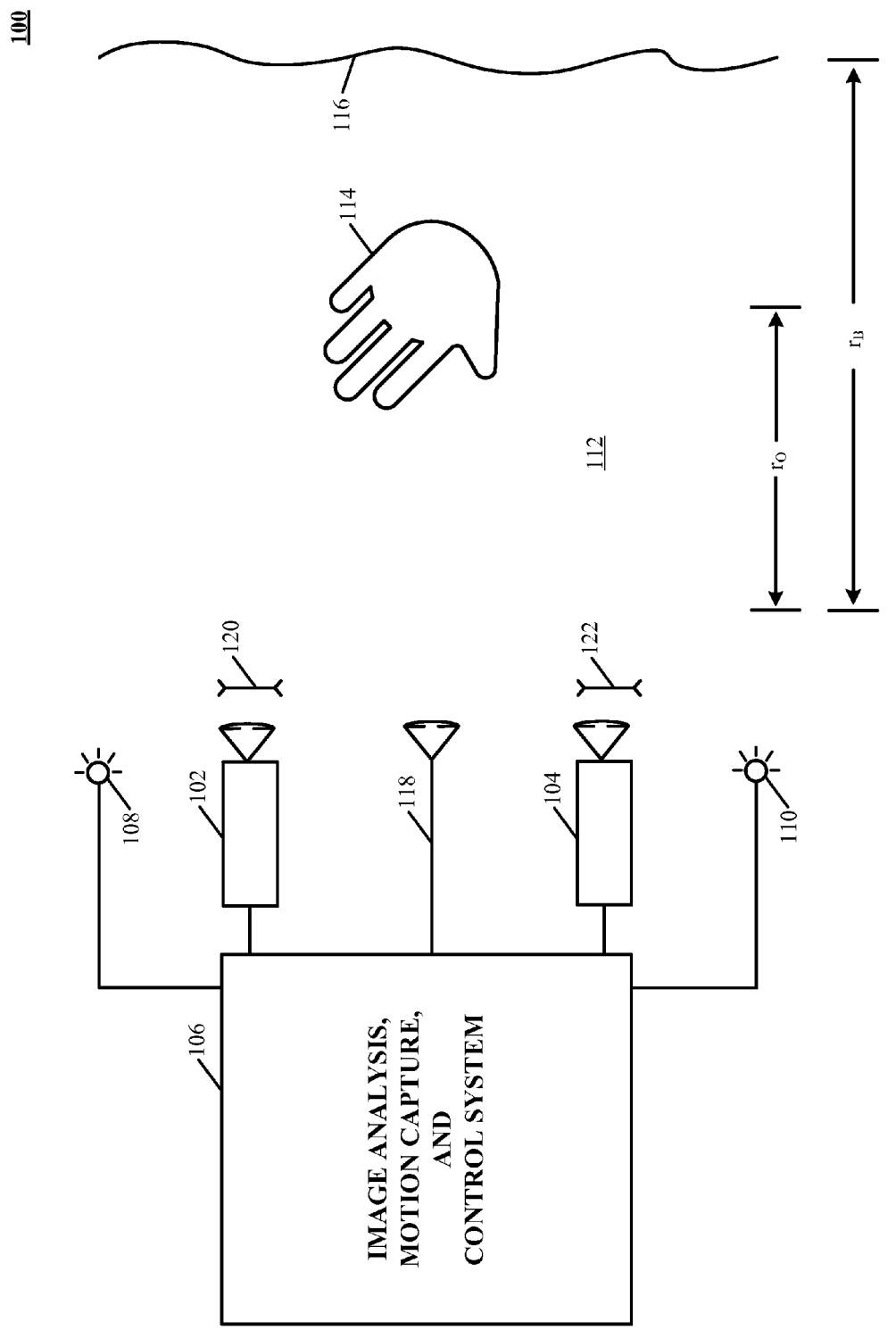
FIG. 1 illustrates an exemplary motion-capture system in accordance with implementations of the technology disclosed.

A common problem with real-time motion-based control is the accurate capture of a user's gesture (or of the user's intended gesture). For example, an inherent unsteadiness of a user's hand and/or errors in the hardware or software used to capture the motion (or any other such disturbances) can cause the resulting output of the system to be unsettled or jerky.

Existing filtering systems and/or signal-conditioning techniques attempt to eliminate these errors, but one factor limiting their effectiveness is the fact that existing motion-capture systems operate in (x,y,z) Cartesian coordinates. At least because these coordinates are not independent of each other with respect to typical human motion (i.e., such motion is rarely along perfectly straight lines), Cartesian coordinates are suboptimal for filtering of motion to smooth out noise in 3D space, particularly for complex functions that define nonlinear paths. A motion-capture system that filters motion in 3D space in a manner better tailored to gestural movements is therefore needed.

The technology disclosed solves the technical problem of accurately capturing non-linear gestural path of a control object in 3D sensory space. The solution includes capturing a non-linear free-form gesture in a 3D sensory space performed by a control object, determining a set of rectangular coordinates of a plurality of 3D positions of control object's movement path during the non-linear free-form gesture, and transforming the set of rectangular coordinates to a set of curvilinear coordinates. It further includes applying at least one filter to the set of curvilinear coordinates to obtain filtered curvilinear motion data for the control object's movement path and generating data for a smoothened representation of the control object's movement path based on the filtered curvilinear motion data.

In one implementation, the curvilinear coordinates are based on a Frenet-Serret coordinate system that is constantly rotating as the control object traverses the movement path in the 3D sensory space, thus providing a more natural coordinate system for the control object's trajectory than a strictly rectangular coordinate system such as the Cartesian system. In other implementations, other curvilinear coordinate systems can be used such as spherical coordinate system or cylindrical coordinate system.

The smoothened representation of the control object's movement path based on curvilinear coordinates such as Frenet-Serret frames can be used for different gesture interpretation and responsiveness purposes. In one implementation, a smoothened representation of moving patterns of fingers of a hand can be used to control and interact with computer systems by moving fingers in the air. In another implementation, it can be used for free-floating handwriting recognition. In such an implementation, the smoothened representation can be applied to disambiguate between similarly shaped trajectories of handwriting characters floated in the 3D space.

Motion-Capture System

Motion-capture systems generally include (i) a camera for acquiring images of an object; (ii) a computer for processing the images to identify and characterize the object; and (iii) a computer display for displaying information related to the identified/characterized object. Referring first to FIG. 1, which illustrates an exemplary motion-capture system 100 including any number of cameras 102, 104 coupled to an image analysis, motion capture, and control system 106 (The system 106 is hereinafter variably referred to as the "image analysis and motion capture system," the "image analysis system," the "motion capture system," "the gesture recognition system," the "control and image-processing system," the "control system," or the "image-processing system," depending on which functionality of the system is being discussed).

Cameras 102, 104 provide digital image data to the image analysis, motion capture, and control system 106, which analyzes the image data to determine the three-dimensional (3D) position, orientation, and/or motion of the object 114 the field of view of the cameras 102, 104. Cameras 102, 104 can be any type of cameras, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. Further, the term "light" is used generally to connote any electromagnetic radiation, which may or may not be within the visible spectrum, and can be broadband (e.g., white light) or narrowband (e.g., a single wavelength or narrow band of wavelengths).

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side. To capture motion of a running person, the volume of interest might have dimensions of tens of meters in order to observe several strides.

Cameras 102, 104 can be oriented in any convenient manner. In one implementation, the optical axes of the cameras 102, 104 are parallel, but this is not required. As described below, each of the 102, 104 can be used to define a "vantage point" from which the object 114 is seen; if the location and view direction associated with each vantage point are known, the locus of points in space that project onto a particular position in the cameras' image plane can be determined. In some implementations, motion capture is reliable only for objects in an area where the fields of view of cameras 102, 104; the cameras 102, 104 can be arranged to provide overlapping fields of view throughout the area where motion of interest is expected to occur.

In some implementations, the illustrated system 100 includes one or more sources 108, 110, which can be disposed to either side of cameras 102, 104, and are controlled by image analysis and motion capture system 106. In one implementation, the sources 108, 110 are light sources. For example, the light sources can be infrared light sources, e.g., infrared light emitting diodes (LEDs), and cameras 102, 104 can be sensitive to infrared light. Use of infrared light can allow the motion-capture system 100 to operate under a broad range of lighting conditions and can avoid various inconveniences or distractions that can be associated with directing visible light into the region where the person is moving. However, a particular wavelength or region of the electromagnetic spectrum can be required. In one implementation, filters 120, 122 are placed in front of cameras 102, 104 to filter out visible light so that only infrared light is registered in the images captured by cameras 102, 104. In another implementation, the sources 108, 110 are sonic sources providing sonic energy appropriate to one or more sonic sensors (not shown in FIG. 1 for clarity sake) used in conjunction with, or instead of, cameras 102, 104. The sonic sources transmit sound waves to the user; with the user either blocking ("sonic shadowing") or altering the sound waves ("sonic deflections") that impinge upon her. Such sonic shadows and/or deflections can also be used to detect the user's gestures and/or provide presence information and/or distance information using ranging techniques. In some implementations, the sound waves are, for example, ultrasound, which are not audible to humans.

It should be stressed that the arrangement shown in FIG. 1 is representative and not limiting. For example, lasers or other light sources can be used instead of LEDs. In implementations that include laser(s), additional optics (e.g., a lens or diffuser) can be employed to widen the laser beam (and make its field of view similar to that of the cameras). Useful arrangements can also include short-angle and wide-angle illuminators for different ranges. Light sources are typically diffuse rather than specular point sources; for example, packaged LEDs with light-spreading encapsulation are suitable.

In operation, light sources 108, 110 are arranged to illuminate a region of interest 112 that includes an entire control object or its portion 114 (in this example, a hand) that can optionally hold a tool or other object of interest. Cameras 102, 104 are oriented toward the region 112 to capture video images of the hand 114. In some implementations, the operation of light sources 108, 110 and cameras 102, 104 is controlled by the image analysis and motion capture system 106, which can be, e.g., a computer system, control logic implemented in hardware and/or software or combinations thereof. Based on the captured images, image analysis and motion capture system 106 determines the position and/or motion of hand 114.

Motion capture can be improved by enhancing contrast between the object of interest 114 and background surfaces like surface 116 visible in an image, for example, by means of controlled lighting directed at the object. For instance, in motion capture system 106 where an object of interest 114, such as a person's hand, is significantly closer to the cameras 102 and 104 than the background surface 116, the falloff of light intensity with distance ($1/r^2$ for point like light sources) can be exploited by positioning a light source (or multiple light sources) near the camera(s) or other image-capture device(s) and shining that light onto the object 114. Source light reflected by the nearby object of interest 114 can be expected to be much brighter than light reflected from more distant background surface 116, and the more distant the background (relative to the object), the more pronounced the effect will be. Accordingly, a threshold cut off on pixel brightness in the captured images can be used to distinguish "object" pixels from "background" pixels. While broadband ambient light sources can be employed, various implementations use light having a confined wavelength range and a camera matched to detect such light; for example, an infrared source light can be used with one or more cameras sensitive to infrared frequencies.

In operation, cameras 102, 104 are oriented toward a region of interest 112 in which an object of interest 114 (in this example, a hand) and one or more background objects 116 can be present. Light sources 108, 110 are arranged to illuminate region 112. In some implementations, one or more of the light sources 108, 110 and one or more of the cameras 102, 104 are disposed below the motion to be detected, e.g., in the case of hand motion, on a table or other surface beneath the spatial region where hand motion occurs. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Further, if the cameras 102, 104 are looking up, there is little likelihood of confusion with background objects (clutter on the user's desk, for example) and other people within the cameras' field of view.

Control and image-processing system 106, which can be, e.g., a computer system, can control the operation of light sources 108, 110 and cameras 102, 104 to capture images of region 112. Based on the captured images, the image-processing system 106 determines the position and/or motion of object 114. For example, as a step in determining the position of object 114, image-analysis system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. With the use of light sources 108, 110, classification of pixels as object or background pixels can be based on the brightness of the pixel. For example, the distance ($r_O$) between an object of interest 114 and cameras 102, 104 is expected to be smaller than the distance ($r_B$) between background object(s) 116 and cameras 102, 104. Because the intensity of light from sources 108, 110 decreases as $1/r^2$, object 114 will be more brightly lit than background 116, and pixels containing portions of object 114 (i.e., object pixels) will be correspondingly brighter than pixels containing portions of background 116 (i.e., background pixels). For example, if $r_B/r_O=2$, then object pixels will be approximately four times brighter than background pixels, assuming object 114 and background 116 are similarly reflective of the light from sources 108, 110, and further assuming that the overall illumination of region 112 (at least within the frequency band captured by cameras 102, 104) is dominated by light sources 108, 110. These conditions generally hold for suitable choices of cameras 102, 104, light sources 108, 110, filters 120, 122, and objects commonly encountered. For example, light sources 108, 110 can be infrared LEDs capable of strongly emitting radiation in a narrow frequency band, and filters 120, 122 can be matched to the frequency band of light sources 108, 110. Thus, although a human hand or body, or a heat source or other object in the background, can emit some infrared radiation, the response of cameras 102, 104 can still be dominated by light originating from sources 108, 110 and reflected by object 114 and/or background 116.

In this arrangement, image-analysis system 106 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some implementations, light sources 108, 110 are bright enough that reflected light from an object at distance $r_O$ produces a brightness level of 1.0 while an object at distance $r_B=2r_O$ produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 102, 104 allows image-analysis system 106 to determine the location in 3D space of object 114, and analyzing sequences of images allows image-analysis system 106 to reconstruct 3D motion of object 114 using motion algorithms.

In accordance with various implementations of the technology disclosed, the cameras 102, 104 (and typically also the associated image-analysis functionality of control and image-processing system 106) are operated in a low-power mode until an object of interest 114 is detected in the region of interest 112. For purposes of detecting the entrance of an object of interest 114 into this region, the system 100 further includes one or more light sensors 118 (e.g., a CCD or CMOS sensor) and/or an associated imaging optic (e.g., a lens) that monitor the brightness in the region of interest 112 and detect any change in brightness. For example, a single light sensor including, e.g., a photodiode that provides an output voltage indicative of (and over a large range proportional to) a measured light intensity can be disposed between the two cameras 102, 104 and oriented toward the region of interest 112. The one or more sensors 118 continuously measure one or more environmental illumination parameters such as the brightness of light received from the environment. Under static conditions—which implies the absence of any motion in the region of interest 112—the brightness will be constant. If an object enters the region of interest 112, however, the brightness can abruptly change. For example, a person walking in front of the sensor(s) 118 can block light coming from an opposing end of the room, resulting in a sudden decrease in brightness. In other situations, the person can reflect light from a light source in the room onto the sensor, resulting in a sudden increase in measured brightness.

The aperture of the sensor(s) 118 can be sized such that its (or their collective) field of view overlaps with that of the cameras 102, 104. In some implementations, the field of view of the sensor(s) 118 is substantially co-existent with that of the cameras 102, 104 such that substantially all objects entering the camera field of view are detected. In other implementations, the sensor field of view encompasses and exceeds that of the cameras. This enables the sensor(s) 118 to provide an early warning if an object of interest approaches the camera field of view. In yet other implementations, the sensor(s) capture(s) light from only a portion of the camera field of view, such as a smaller area of interest located in the center of the camera field of view.

The control and image-processing system 106 monitors the output of the sensor(s) 118, and if the measured brightness changes by a set amount (e.g., by 10% or a certain number of candela), it recognizes the presence of an object of interest in the region of interest 112. The threshold change can be set based on the geometric configuration of the region of interest and the motion-capture system, the general lighting conditions in the area, the sensor noise level, and the expected size, proximity, and reflectivity of the object of interest so as to minimize both false positives and false negatives. In some implementations, suitable settings are determined empirically, e.g., by having a person repeatedly walk into and out of the region of interest 112 and tracking the sensor output to establish a minimum change in brightness associated with the person's entrance into and exit from the region of interest 112. Of course, theoretical and empirical threshold-setting methods can also be used in conjunction. For example, a range of thresholds can be determined based on theoretical considerations (e.g., by physical modelling, which can include ray tracing, noise estimation, etc.), and the threshold thereafter fine-tuned within that range based on experimental observations.

In implementations where the area of interest 112 is illuminated, the sensor(s) 118 will generally, in the absence of an object in this area, only measure scattered light amounting to a small fraction of the illumination light. Once an object enters the illuminated area, however, this object can reflect substantial portions of the light toward the sensor(s) 118, causing an increase in the measured brightness. In some implementations, the sensor(s) 118 is (or are) used in conjunction with the light sources 108, 110 to deliberately measure changes in one or more environmental illumination parameters such as the reflectivity of the environment within the wavelength range of the light sources. The light sources can blink, and a brightness differential be measured between dark and light periods of the blinking cycle. If no object is present in the illuminated region, this yields a baseline reflectivity of the environment. Once an object is in the area of interest 112, the brightness differential will increase substantially, indicating increased reflectivity. (Typically, the signal measured during dark periods of the blinking cycle, if any, will be largely unaffected, whereas the reflection signal measured during the light period will experience a significant boost.) Accordingly, the control system 106 monitoring the output of the sensor(s) 118 can detect an object in the region of interest 112 based on a change in one or more environmental illumination parameters such as environmental reflectivity that exceeds a predetermined threshold (e.g., by 10% or some other relative or absolute amount). As with changes in brightness, the threshold change can be set theoretically based on the configuration of the image-capture system and the monitored space as well as the expected objects of interest, and/or experimentally based on observed changes in reflectivity.

Computer System

Figure 2:
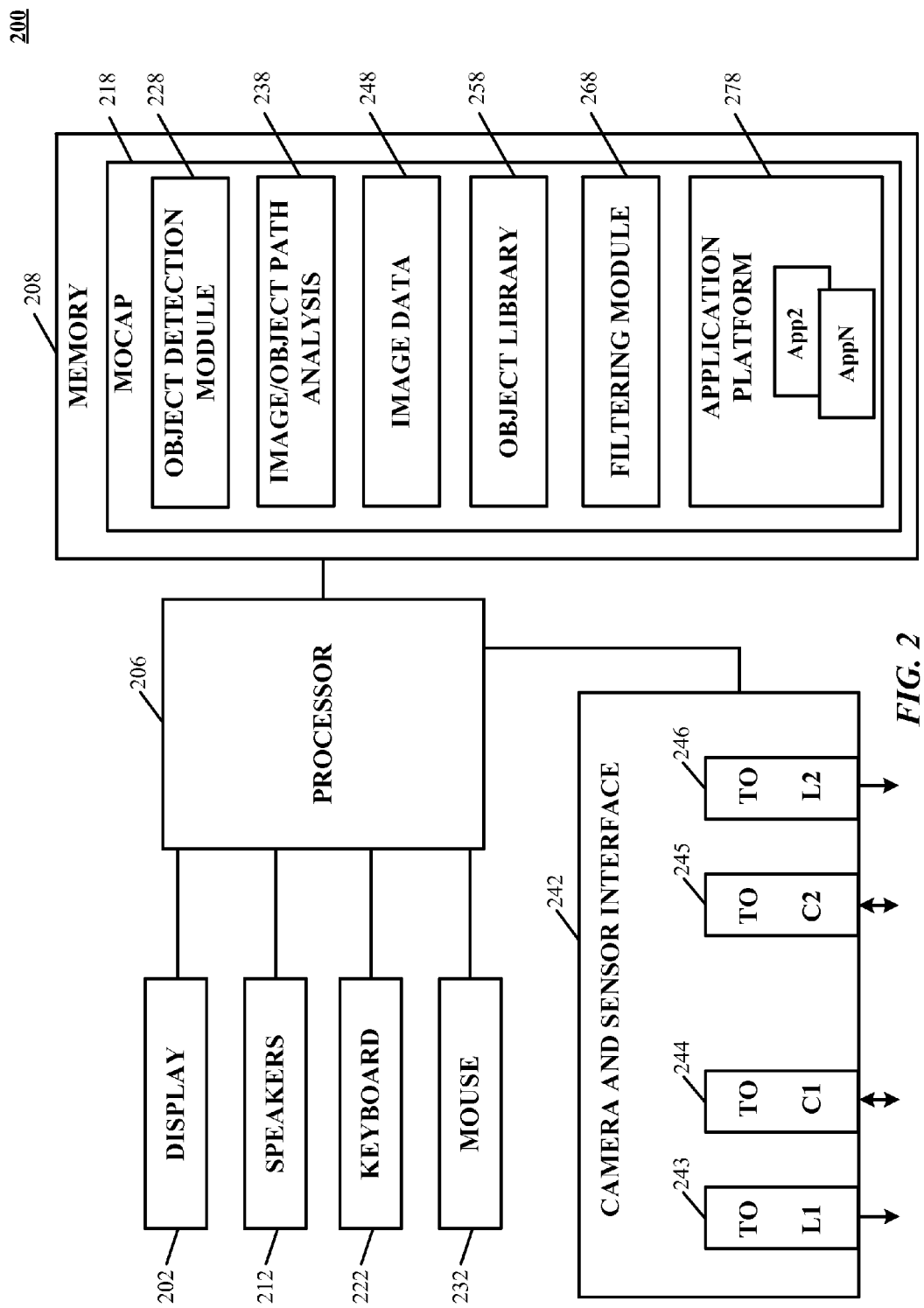
FIG. 2 illustrates an exemplary computer system for image processing, analysis, and display in accordance with implementations of the technology disclosed.

FIG. 2 is a simplified block diagram of a computer system 200, implementing all or portions of image analysis and motion capture system 106 according to an implementation of the technology disclosed. Image analysis and motion capture system 106 can include or consist of any device or device component that is capable of capturing and processing image data. In some implementations, computer system 200 includes a processor 206, memory 208, a camera and sensor interface 242, a display 202 (or other presentation mechanism(s), e.g. holographic projection systems, wearable goggles or other head mounted displays (HMDs), heads up displays (HUDs), other visual presentation mechanisms or combinations thereof, speakers 212, a keyboard 222, and a mouse 232. Memory 208 can be used to store instructions to be executed by processor 206 as well as input and/or output data associated with execution of the instructions. In particular, memory 208 contains instructions, conceptually illustrated as a group of modules described in greater detail below, that control the operation of processor 206 and its interaction with the other hardware components. An operating system directs the execution of low-level, basic system functions such as memory allocation, file management and operation of mass storage devices. The operating system can be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid physical arrangement RAM, solid physical arrangement ROM, and the like. The storage media are typically connected to the system bus through a removable or non-removable memory interface.

According to some implementations, cameras 102, 104 and/or light sources 108, 110 can connect to the computer 200 via a universal serial bus (USB), FireWire, or other cable, or wirelessly via Bluetooth, Wi-Fi, etc. The computer 200 can include a camera interface 242, implemented in hardware (e.g., as part of a USB port) and/or software (e.g., executed by processor 206), that enables communication with the cameras 102, 104 and/or light sources 108, 110. The camera interface 242 can include one or more data ports and associated image buffers for receiving the image frames from the cameras 102, 104; hardware and/or software signal processors to modify the image data (e.g., to reduce noise or reformat data) prior to providing it as input to a motion-capture or other image-processing program; and/or control signal ports for transmit signals to the cameras 102, 104, e.g., to activate or deactivate the cameras, to control camera settings (frame rate, image quality, sensitivity, etc.), or the like.

Processor 206 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Camera and sensor interface 242 can include hardware and/or software that enables communication between computer system 200 and cameras such as cameras 102, 104 shown in FIG. 1, as well as associated light sources such as light sources 108, 110 of FIG. 1. Thus, for example, camera and sensor interface 242 can include one or more data ports 244, 245 to which cameras can be connected, as well as hardware and/or software signal processors to modify data signals received from the cameras (e.g., to reduce noise or reformat data) prior to providing the signals as inputs to a motion-capture ("mocap") program 218 executing on processor 206. In some implementations, camera and sensor interface 242 can also transmit signals to the cameras, e.g., to activate or deactivate the cameras, to control camera settings (frame rate, image quality, sensitivity, etc.), or the like. Such signals can be transmitted, e.g., in response to control signals from processor 206, which can in turn be generated in response to user input or other detected events.

Camera and sensor interface 242 can also include controllers 243, 246, to which light sources (e.g., light sources 108, 110) can be connected. In some implementations, controllers 243, 246 provide operating current to the light sources, e.g., in response to instructions from processor 206 executing mocap program 218. In other implementations, the light sources can draw operating current from an external power supply, and controllers 243, 246 can generate control signals for the light sources, e.g., instructing the light sources to be turned on or off or changing the brightness. In some implementations, a single controller can be used to control multiple light sources.

Instructions defining mocap program 218 are stored in memory 208, and these instructions, when executed, perform motion-capture analysis on images supplied from cameras connected to sensor interface 242. In one implementation, mocap program 218 includes various modules, such as an object detection module 228 and an image and/or object path analysis module 238. Object detection module 228 can analyze images (e.g., images captured via sensor interface 242) to detect edges and/or features of an object therein and/or other information about the object's location. Object path analysis module 238 can analyze the object information provided by object detection module 228 to determine the 3D position and/or motion of the object (e.g., a user's hand). Examples of operations that can be implemented in code modules of mocap program 218 are described below.

The memory 208 can further store input and/or output data associated with execution of the instructions (including, e.g., input and output image data 248) as well as additional information used by the various software applications; for example, in some implementations, the memory 208 stores an object library 258 of canonical models of various objects of interest. As described below, an object detected in the camera images can identified by matching its shape to a model in the object library 258, and the model can then inform further image analysis, motion prediction, etc. In addition, the memory 208 can also include other information and/or code modules used by mocap program 218 such as an application platform 278, which allows a user to interact with the mocap program 218 using different applications like application 1 (App1), application 2 (App2), and application N (AppN).

Display 202, speakers 212, keyboard 222, and mouse 232 can be used to facilitate user interaction with computer system 200. In some implementations, results of motion capture using sensor interface 242 and mocap program 218 can be interpreted as user input. For example, a user can perform hand gestures that are analyzed using mocap program 218, and the results of this analysis can be interpreted as an instruction to some other program executing on processor 206 (e.g., a web browser, word processor, or other application). Thus, by way of illustration, a user might use upward or downward swiping gestures to "scroll" a webpage currently displayed on display 202, to use rotating gestures to increase or decrease the volume of audio output from speakers 212, and so on.

It will be appreciated that computer system 200 is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, heads up displays (HUDs) for vehicles, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

In another example, in some implementations, the cameras 102, 104 are connected to or integrated with a special-purpose processing unit that, in turn, communicates with a general-purpose computer, e.g., via direct memory access ("DMA"). The processing unit can include one or more image buffers for storing the image data read out from the camera sensors, a GPU or other processor and associated memory implementing at least part of the motion-capture algorithm, and a DMA controller. The processing unit can provide processed images or other data derived from the camera images to the computer for further processing. In some implementations, the processing unit sends display control signals generated based on the captured motion (e.g., of a user's hand) to the computer, and the computer uses these control signals to adjust the on-screen display of documents and images that are otherwise unrelated to the camera images (e.g., text documents or maps) by, for example, shifting or rotating the images.

While computer system 200 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 1 and 2, the user performs a gesture that is captured by the cameras 102, 104 as a series of temporally sequential images. In other implementations, cameras 102, 104 can capture any observable pose or portion of a user. For instance, if a user walks into the field of view near the cameras 102, 104, cameras 102, 104 can capture not only the whole body of the user, but the positions of arms and legs relative to the person's core or trunk. These are analyzed by the mocap 218, which provides input to an electronic device, allowing a user to remotely control the electronic device and/or manipulate virtual objects, such as prototypes/models, blocks, spheres, or other shapes, buttons, levers, or other controls, in a virtual environment displayed on display 202. The user can perform the gesture using any part of her body, such as a finger, a hand, or an arm. As part of gesture recognition or independently, the image analysis and motion capture system 106 can determine the shapes and positions of the user's hand in 3D space and in real time; see, e.g., U.S. Ser. Nos. 61/587,554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the image analysis and motion capture system processor 206 may not only recognize gestures for purposes of providing input to the electronic device, but can also capture the position and shape of the user's hand in consecutive video images in order to characterize the hand gesture in 3D space and reproduce it on the display screen 202.

In one implementation, the mocap 218 compares the detected gesture to a library of gestures electronically stored as records in a database (object library 258), which is implemented in the image analysis and motion capture system 106, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

In various implementations, the motion captured in a series of camera images is used to compute a corresponding series of output images for presentation on the display 202. For example, camera images of a moving hand can be translated by the processor 206 into a wire-frame or other graphical representations of motion of the hand. In any case, the output images can be stored in the form of pixel data in a frame buffer, which can, but need not be, implemented in main memory 208. A video display controller reads out the frame buffer to generate a data stream and associated control signals to output the images to the display 202. The video display controller can be provided along with the processor 206 and memory 208 on-board the motherboard of the computer 200, and can be integrated with the processor 206 or implemented as a co-processor that manipulates a separate video memory.

In some implementations, the computer 200 is equipped with a separate graphics or video card that aids with generating the feed of output images for the display 202. The video card generally includes a graphical processing unit ("GPU") and video memory, and is useful, in particular, for complex and computationally expensive image processing and rendering. The graphics card can implement the frame buffer and the functionality of the video display controller (and the on-board video display controller can be disabled). In general, the image-processing and motion-capture functionality of the system 200 can be distributed between the GPU and the main processor 206.

Coordinate Transformation

In one implementation, an object detection module 228 expresses the changing locations of an object as it traverses a path through a monitored space in Cartesian/(x,y,z) coordinates. The object detection module 228 identifies these coordinates by analyzing the position of the object as captured in a sequence of images. A filtering module 268 receives the Cartesian coordinates, converts the path of the object into a Frenet-Serret space, and filters the path in that space. In one implementation, the filtering module 268 then converts the filtered Frenet-Serret path back into Cartesian coordinates for downstream processing by other programs, applications, modules, or systems.

Figure 3A:
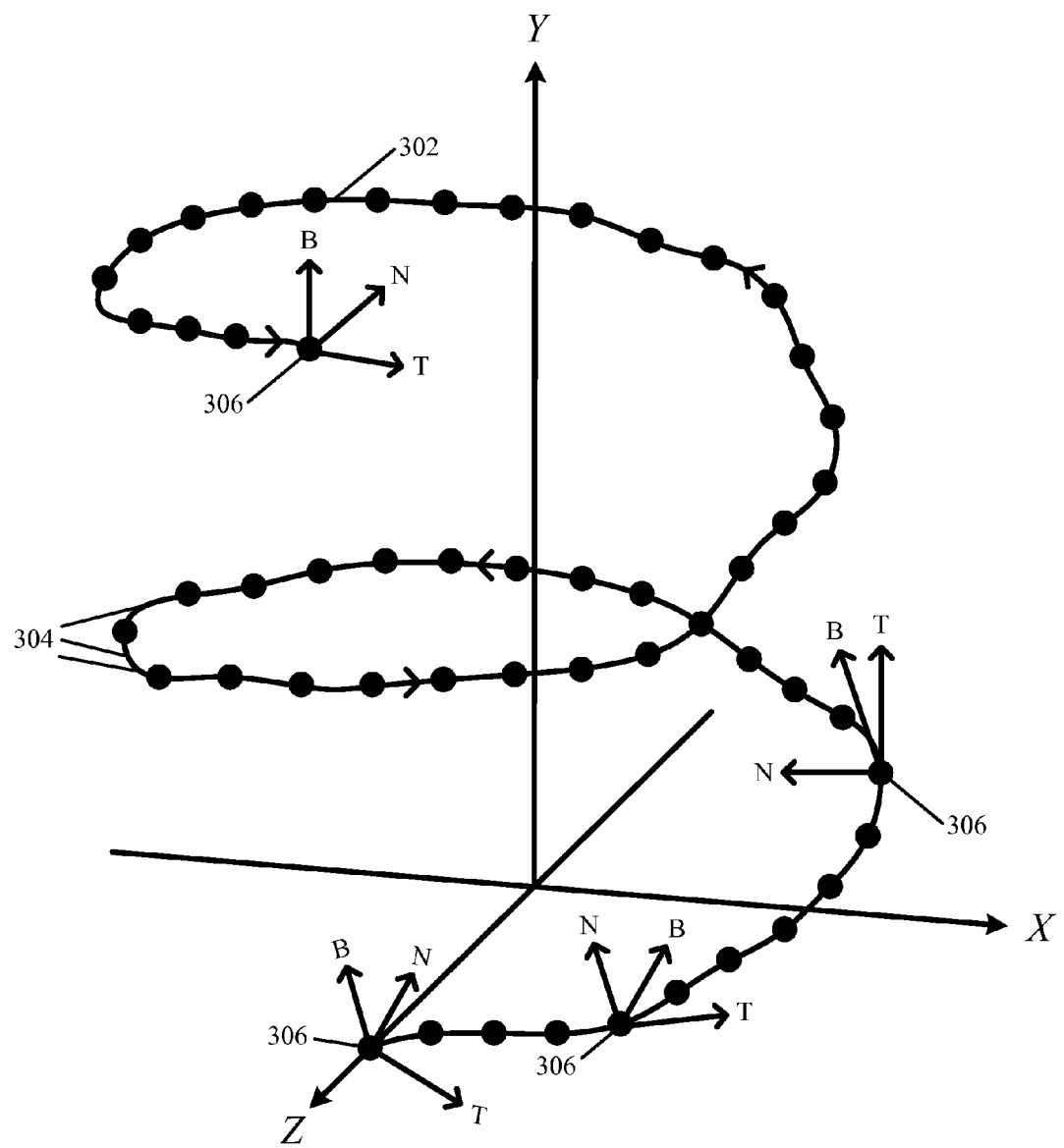
FIGS. 3A and 3B illustrate an object's path of motion in accordance with implementations of the technology disclosed.

Frenet-Serret formulas describe the kinematic properties of a particle moving along a continuous, differentiable curve in 3D space. A Frenet-Serret frame is based on a set of orthonormal vectors as can be understood with reference to FIG. 3A, which illustrates a path 302 of an object (e.g., a user's hand, a stylus, or any other object) through the monitored space; points 304 are the (x,y,z) locations of the object as identified by the object detection module 228. The filtering module 268 attaches a Frenet-Serret frame of reference 306 to a plurality of locations (which can or may not correspond to the points 304) on the path 302. The Frenet-Serret frame consists of (i) a tangent unit vector (T) that is tangent to the path 302 (e.g., the vector T points in the direction of motion), (ii) a normal unit vector (N) that is the derivative of T with respect to an arclength parameter of the path 302 divided by its length, and (iii) a binormal unit vector (B) that is the cross-product of T and N. Alternatively, the tangent vector can be determined by normalizing a velocity vector (as explained in greater detail below) if it is known at a given location on the path 302. These unit vectors T, N, B collectively form the orthonormal basis in 3D space known as a TNB frame or Frenet-Serret frame.

In one implementation, the frames 306 are associated with each point 302 identified by object detection module 228. Alternatively, the Frenet-Serret frames can be associated with locations along the path 302 that do not correspond to the points 304; instead, these points can be associated with any location along the path 302. The filtering module 268 can distribute the locations evenly along the path 302 or, alternatively, can create additional frames at locations along the path 302 at which the path 302 changes more rapidly (when, e.g., a change in the path 302 greater than a predefined threshold is detected). The Frenet-Serret frame unit vectors T, N, B at a given location can be calculated based on a minimum of at least one point 304 before and one point 304 after the given location to determine the direction of movement, the tangent vector, and the normal vector. The binormal vector is calculated as the cross-product of the tangent and normal vectors. Any method of converting the path 302 represented by the points 304 to Frenet-Serret frames is within the scope of the technology disclosed.

According to some implementations, a gestural path of a control object can be entirely defined by its angles in the relative curvilinear coordinates. In one example, if C is a vector representing the control object in the Cartesian coordinate system as C(x,y,z)=(initial point−final point) (x,y,z). Then, transformation to a curvilinear coordinate system can be denoted as C($\rho$, $\theta$, $\varphi$), where $\rho$ represents the radius of a curve, $\theta$ is the azimuth angle of the curve, and $\varphi$ is the inclination angle of the curve.

Jacobian of a Transformation

Any plane having ordinary Cartesian coordinates in a standard 3D space can be transformed by an invertible 3×3 matrix using homogeneous coordinates in a curvilinear space. In one implementation, a set of physical Cartesian coordinates (x,y,z,t) can be transformed to curvilinear coordinates using the following independent variables (1) such that a matrix form (2) is generated via the chain rule:

$$x = x(\xi, \eta, \zeta, t) \quad (1)$$
$$y = y(\xi, \eta, \zeta, t)$$
$$z = z(\xi, \eta, \zeta, t)$$

$$\begin{pmatrix} \frac{\partial u}{\partial x} & \frac{\partial u}{\partial y} & \frac{\partial u}{\partial z} \\ \frac{\partial v}{\partial x} & \frac{\partial v}{\partial y} & \frac{\partial v}{\partial z} \\ \frac{\partial w}{\partial x} & \frac{\partial w}{\partial y} & \frac{\partial w}{\partial z} \end{pmatrix} = \begin{pmatrix} \frac{\partial u}{\partial \xi} & \frac{\partial u}{\partial \eta} & \frac{\partial u}{\partial \zeta} \\ \frac{\partial v}{\partial \xi} & \frac{\partial v}{\partial \eta} & \frac{\partial v}{\partial \zeta} \\ \frac{\partial w}{\partial \xi} & \frac{\partial w}{\partial \eta} & \frac{\partial w}{\partial \zeta} \end{pmatrix} \begin{pmatrix} \frac{\partial \xi}{\partial x} & \frac{\partial \xi}{\partial y} & \frac{\partial \xi}{\partial z} \\ \frac{\partial \eta}{\partial x} & \frac{\partial \eta}{\partial y} & \frac{\partial \eta}{\partial z} \\ \frac{\partial \zeta}{\partial x} & \frac{\partial \zeta}{\partial y} & \frac{\partial \zeta}{\partial z} \end{pmatrix} \quad (2)$$

Further, in one implementation, a Jacobian matrix can be used to map variables from a Cartesian reference system to a curvilinear reference system. A Jacobian matrix (3) of the transformation is represented as follows:

$$[J] = \begin{pmatrix} \frac{\partial \xi}{\partial x} & \frac{\partial \xi}{\partial y} & \frac{\partial \xi}{\partial z} \\ \frac{\partial \eta}{\partial x} & \frac{\partial \eta}{\partial y} & \frac{\partial \eta}{\partial z} \\ \frac{\partial \zeta}{\partial x} & \frac{\partial \zeta}{\partial y} & \frac{\partial \zeta}{\partial z} \end{pmatrix} \quad (3)$$

In another implementation, an inverse Jacobian matrix (4) depicted below can be used to map Cartesian coordinates to curvilinear coordinates.

$$[J]^{-1} = \begin{pmatrix} \frac{\partial x}{\partial \xi} & \frac{\partial x}{\partial \eta} & \frac{\partial x}{\partial \zeta} \\ \frac{\partial y}{\partial \xi} & \frac{\partial y}{\partial \eta} & \frac{\partial y}{\partial \zeta} \\ \frac{\partial z}{\partial \xi} & \frac{\partial z}{\partial \eta} & \frac{\partial z}{\partial \zeta} \end{pmatrix} \quad (4)$$

Helix Transformation

In yet another implementation, a helix defined by position vectors with Cartesian coordinates can be converted into the orthonormal vectors tangent, normal, and/or binormal direction of the Frenet-Serret frame, as shown in the example below worked out in a mathematics software such as MapleSoft™:

$SetCoordinates(cartesian[x, y, z])$:

$R := PositionVector([a\cos(p), a\sin(p), p])$ $$R := \begin{bmatrix} a\cos(p) \\ a\sin(p) \\ (p) \end{bmatrix}$$

According to one implementation, the tangent-normal-binormal frame is obtained with:

$$\text{simplify}([TNBFrame(R, p)])$$

$$\left[\left[\begin{array}{c}-\dfrac{a\sin(p)}{\sqrt{1+a^2}}\\ \dfrac{a\cos(p)}{\sqrt{1+a^2}}\\ \dfrac{1}{\sqrt{1+a^2}}\end{array}\right], \left[\begin{array}{c}-\cos(p)\\ -\sin(p)\\ 0\end{array}\right], \left[\begin{array}{c}\dfrac{\sin(p)}{\sqrt{1+a^2}}\\ -\dfrac{\cos(p)}{\sqrt{1+a^2}}\\ \dfrac{a}{\sqrt{1+a^2}}\end{array}\right]\right]$$

In one implementation, the curvature for the Frenet-Serret frame is obtained as:

$$\text{simplify}([Curvature(R, p)])$$

$$\dfrac{a}{1+a^2}$$

In one implementation, the torsion for the Frenet-Serret frame is obtained as:

$$\text{simplify}([Torsion(R, p)])$$

$$\dfrac{1}{1+a^2}$$

Smoothing

In one implementation, a best-fit curve method is first used to predict the object's trajectory and connect each known point 304 along the object's path 302. Any method of 3D curve fitting known can be used to define curves connecting all the points, such that path 302 can be defined by one continuous function, r(t), or a set of functions, $r_1(t)$, $r_2(t)$, . . . $r_n(t)$. In one implementation, a velocity vector at each known point 304 is estimated to aid in curve fitting to guarantee that all curves meet smoothly. The velocity vector can be calculated at any one point by referencing at least other point and analyzing the distance and elapsed time between points to determine speed and direction. Curve segments (e.g., Hermite curves) are then connected in a continuous fashion ensuring that the end point of one curve is the same as the starting point of the next, as well as ensuring that the tangent vector of each curve at the join point has the same magnitude and direction as the velocity vector at that point. In an alternative implementation, curve segments are connected without regard for velocity and the irregular joins are smoothed out during the filtering process described in further detail below.

In one implementation, a smoothing filter is applied to a set of sequential unit vectors corresponding to the tangent, normal, and/or binormal direction of the Frenet-Serret frame. To some filters, each unit vector is specified by one scalar value per dimension (e.g., degrees away from the original of that plane) and filtered separately. A 3D unit vector can be specified by three scalar values as its angle away from the origin in each X, Y, and Z plane. In one implementation, a smoothing filter is applied to each set of scalar values, the direction of the vector is reconstructed from its filtered values, and the other two vectors of the frame at each point are recalculated accordingly. A 3D curve interpolation method can then be applied to generate a 3D curve that passes through the points in the given order, matching the filtered Frenet-Serret frame at each point and representing the object's path of motion.

In various implementations, another method can be employed for noise filtering. Once a reference Frenet-Serret frame 306 has been associated with various points 304 along the object's path 302, the rotation between consecutive frames can be determined using the Frenet-Serret formulas describing curvature and torsion. The total rotation of the Frenet-Serret frame is the combination of the rotations of each of the three Frenet vectors described by the formulas $$\dfrac{dT}{ds} = \kappa N, \dfrac{dN}{ds} = -\kappa T + \tau B, \text{ and } \dfrac{dB}{ds} = -\tau N,$$

where $$\dfrac{d}{ds}$$

is the derivative with respect to arclength, κ is the curvature, and τ is the torsion of the curve. The two scalars κ and τ can define the curvature and torsion of a 3D curve, in that the curvature measures how sharply a curve is turning while torsion measures the extent of its twist in 3D space. Alternatively, the curvature and torsion parameters can be calculated directly from the derivative of best-fit curve functions (i.e., velocity) using, for example, the equations $$\kappa = \dfrac{|\vec{v}\times\vec{a}|}{|\vec{v}|^3} \text{ and } \tau = \dfrac{(\vec{v}\times\vec{a})\cdot\vec{a}'}{|\vec{v}\times\vec{a}|^2}.$$

Figure 3B:
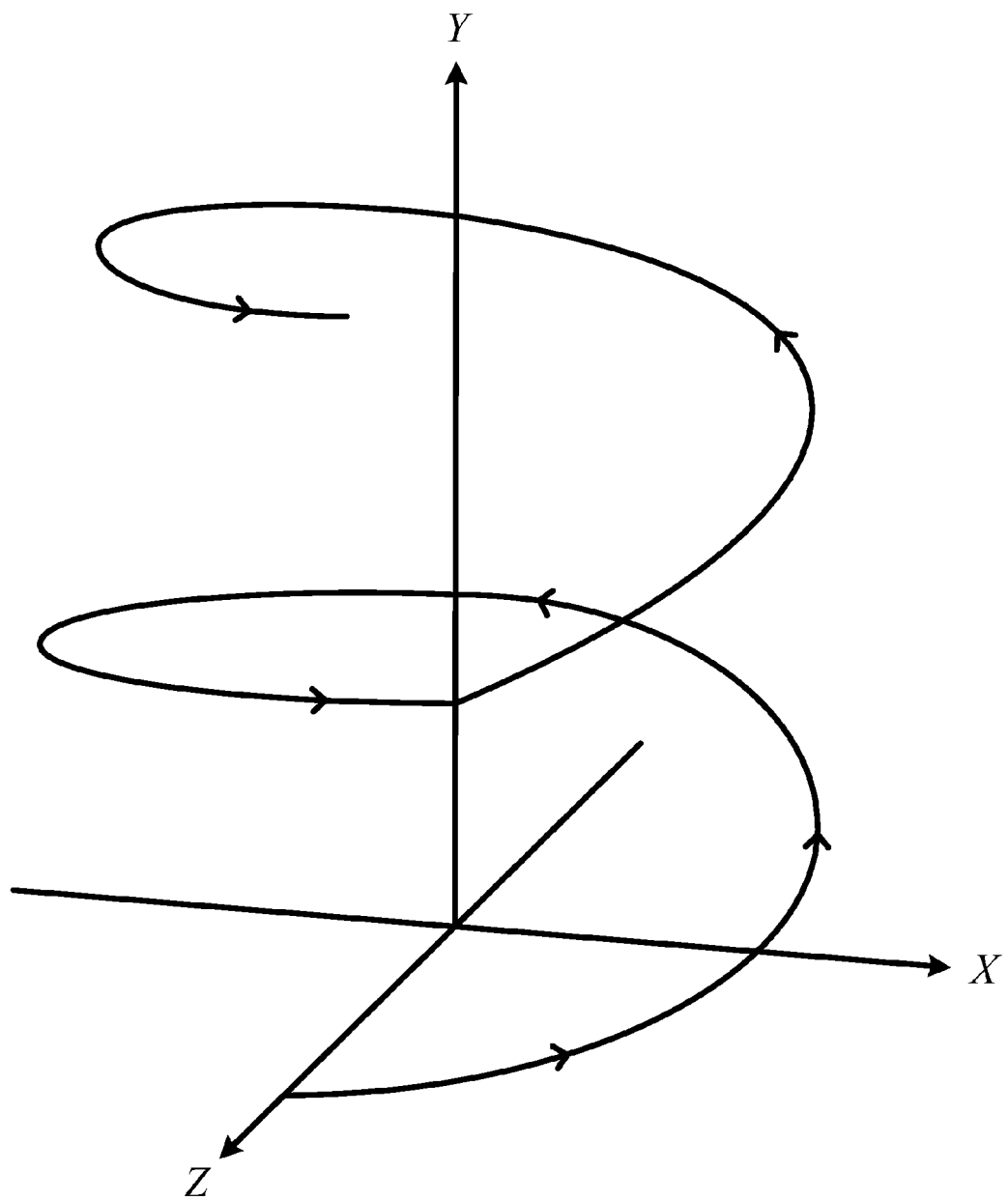

Referring now to FIG. 3B, a smooth path 310 depicting the object's motion is constructed from the filtered curvature and torsion parameters describing the twists and turns in 3D space of the reference Frenet-Serret frames. The smoother the plot of these two parameters over time, the smoother the resultant path 310 can be. The coordinates describing this representation 310 of the object's path of motion can be converted, by the filtering module 268, back to Cartesian coordinates for display or for interpretation as a control signal by the system 200.

In some implementations, additional filtering, modification or smoothing can be applied to the resulting path 310 utilizing the principles of an Euler spiral (or similar construct) to create aesthetically pleasing curves and transitions before converting the coordinates back to Cartesian coordinates. Connecting and transiting the geometry between a tangent and a circular curve can be achieved based on the principle of linear variation using an Euler spiral—specifically, a spiral with a curvature near zero at the tangent section and which increases linearly with its curve length such that when the spiral meets the circular curve, its curvature becomes equal to that of the curve. For example, when an object changes direction sharply, a curve defined by Euler's spiral can be used instead of a sharp point to represent this quick movement. In addition, a 3D curve-fitting interpolation technique utilizing the principle of the Euler spiral can be applied to path 310 for additional smoothing. The average curvature of multiple points along path 310 can be used to fit a curve to these points with a radius equal to the reciprocal of the average curvature. In one implementation, the Euler spiral is used in a similar manner to fill in missing data points by connecting known points based on curvature.

In one implementation, the filtered Frenet-Serret path 310 (with or without modification by, for example, application of the Euler spiral) can be used to better predict future motion of the object. By removing or reducing any noise, inconsistencies, or unintended motion in the path 302, the filtered path can better predict a user's intent in executing a gestural motion. The predicted future motion along the Frenet-Serret path 310 is therefore based on past-detected motion and a kinematic estimate of the user's intent behind the motion.

The filtering and/or application of the Euler spiral can be employed to modify the path 302 in order to create a resultant path 310 that better reflects the user's gestural intent. For example, the filtering module 268 can determine that the user intended to draw a smooth helical shape (or any other shape) but an inherent unsteadiness of his or her hand, inaccuracies in motion, or other disturbances, caused the actual path of motion to be noisy, jittery, or otherwise different from the desired, ideal shape. The filtered representation can also provide an aesthetically pleasing representation of the object's path for display on the display 202, or can be used to predict a user's intended free-form gesture before it has been completed (and generating an appropriate control signal based on gesture recognition).

Orientation Invariant Motion Capture

According to one implementation, the technology disclosed solves the technical problem of capturing gestures that are independent of the orientation of the gestural paths created by the gestures. In some implementation, a filtered Frenet-Serret frame allows for the recognition and classification of gestures (and/or motions) that are orientation invariant, i.e. the Frenet-Serret frame motion data may not take into account the overall translation or rotation of the motion that was recorded, unlike the Cartesian coordinate sequential data. This provides the advantage of enabling the motion-capture system 100 to identify the trajectory of a motion independent of the orientation of the motion. Thus, if a user produces a signature motion (or any gesture), the Frenet-Serret data reported from that motion can be the same regardless of the orientation (translation and rotation) of the motion with respect to the capturing device. This can be very useful when performing motion/gesture recognition, since there are many motions/gestures that do not depend on the orientation of the motion.

Flowcharts

Figure 4:
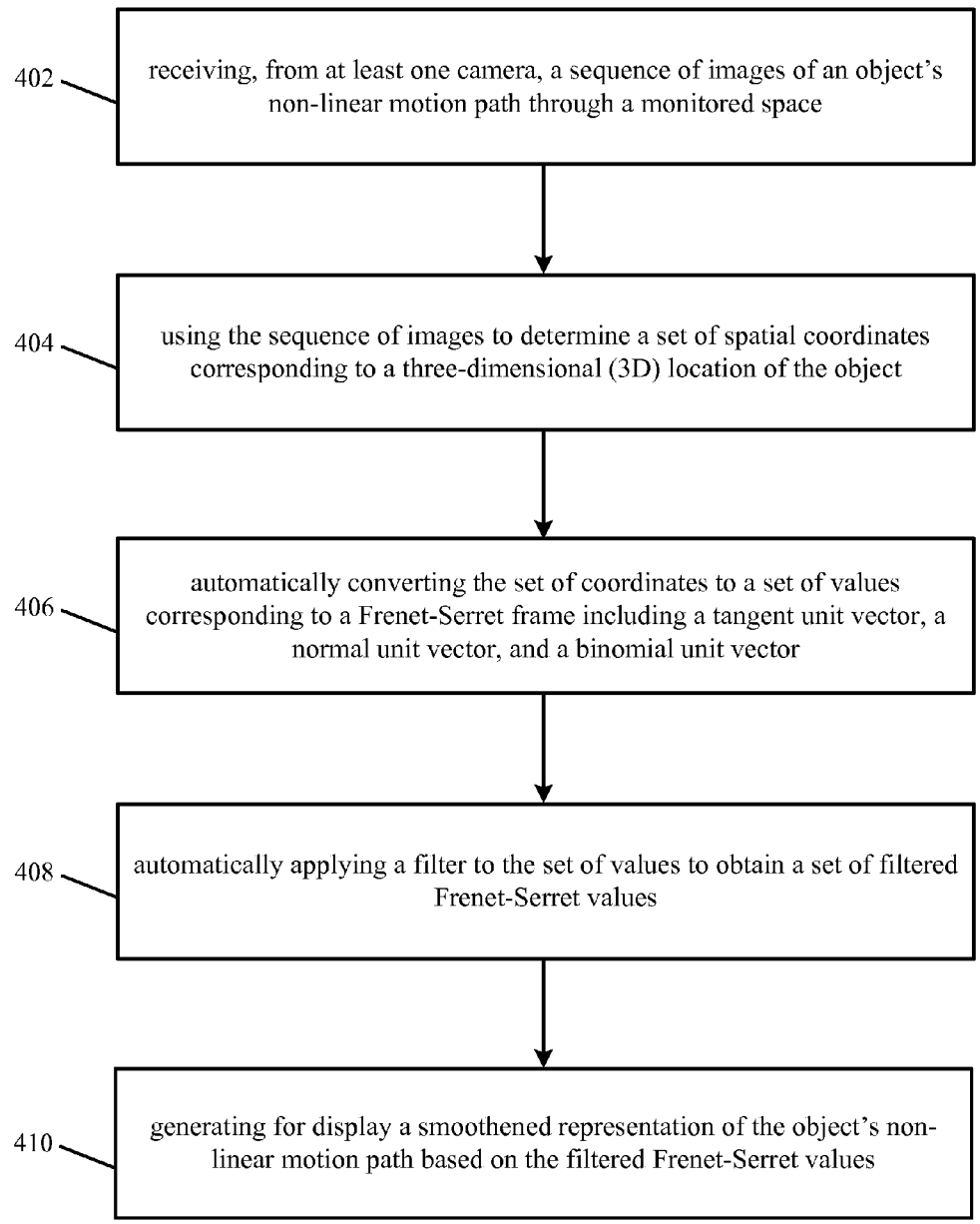
FIG. 4 illustrates a flowchart for eliminating noise to predict an object's intended path of motion in accordance with implementations of the technology disclosed.

FIG. 4 illustrates an exemplary method 400 of constructing a filtered 3D representation of an object's path of motion in accordance with one implementation of the current technology disclosed. With reference FIGS. 1, 2 and 4, the object detection module 228 analyzes the images from cameras 102, 104 received by the device interface 242 (action 402) to identify a sequence of coordinates representing the 3D location of the object along path 302 (action 404). In one implementation, the object detection module 228 analyzes data from each image frame captured to compute the 3D Cartesian coordinates 304 of the object's location in each frame. Alternatively, any method of data sampling can be employed by the object detection module 228 to reduce computational overhead generated in analyzing data from every frame. In one implementation, the object detection module 228 is configured to dynamically track the object's movement to signal the cameras 102, 104, via interface 242, to sample at a higher rate when an increase in the object's speed and/or change of direction is detected. The set of (x,y,z) coordinates is converted to one or more Frenet-Serret frames (action 406), as described above, and the converted frames are filtered (action 408). The filtered data can then be converted back to (x,y,z) space (action 410).

Some implementations of the technology disclosed include the establishment of an (x,y,z) coordinate frame of reference (i.e., the definition of an origin point) before the Frenet-Serret frame is parameterized. While these methods can facilitate the operation of computing systems that utilize Cartesian reference space, in an alternative implementation, an origin for a Cartesian frame of reference is not established during image analysis. Instead, the object recognition module 228 is configured to identify each location of the object captured in the sequence of images in relation to the previous and/or next location as a curve described by the Frenet-Serret frame formulas. More specifically, the object recognition module 228 can define the Frenet-Serret frame 306 at the first point of the path 302 and describe its movement as it twists and turns through each point 302 by two functions: curvature as a function of time and torsion as a function of time.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Any interpolation and/or filtering methods or systems can be applied to the torsion and/or curvature parameters without further modifications to the value sets or functions describing them. In one implementation, a moving average filter is applied to the set of curvature values and/or torsion values, according to the following equation:

$$y_t = \frac{y_{t-1} + y_t + y_{t+2}}{3}$$

This method replaces each value in the set with the average of 'm' adjacent values, where 'm' is a positive integer between, in some implementations, 3 and 9. Alternatively or in addition, a weighted moving-average filter can be applied. Because both the curvature and torsion values are scalars (i.e., they are associated with a particular point in time), one of skill in the art will recognize that most common filter and/or interpolation methods including, but not limited to, additive smoothing, Kalman filter, kernel smoother, Laplacian smoothing, recursive filter, Savitzky-Golay smoothing filter, local regression, smoothing spline, Ramer-Douglas-Peucker algorithm, exponential smoothing, Kolmogorov-Zurbenko filter, or any combination thereof can be applied to either set of values.

Figure 5:
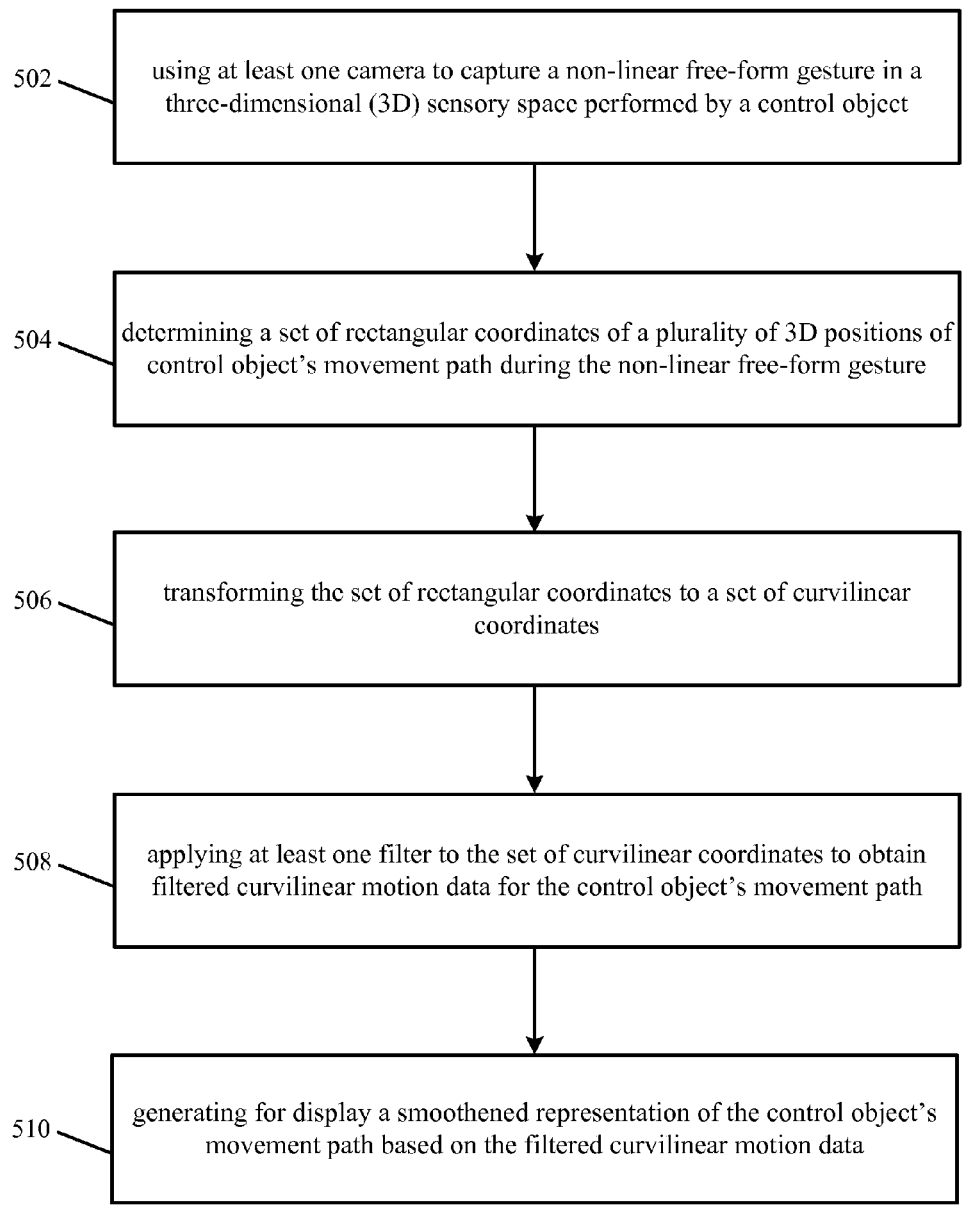
FIG. 5 is a flowchart showing a method of accurately capturing non-linear gestural path of a control object in 3D sensory space.

FIG. 5 is a flowchart 500 showing a method of accurately capturing non-linear gestural path of a control object in 3D sensory space. At action 502, at least one camera is used to capture a non-linear free-form gesture in a three-dimensional (3D) sensory space performed by a control object, as described above in this application.

At action 504, a set of rectangular coordinates are determined for a plurality of 3D positions of control object's movement path during the non-linear free-form gesture, as described above in this application.

At action 506, the set of rectangular coordinates are transformed into a set of curvilinear coordinates. In one implementation, transforming the set of rectangular coordinates to the set of curvilinear coordinates further includes generating a Jacobian of a Transformation of the rectangular coordinates. In another implementation, transforming the set of rectangular coordinates to the set of curvilinear coordinates includes generating an inverse Jacobian of a Transformation of the rectangular coordinates. In yet another implementation, transforming the set of rectangular coordinates to the set of curvilinear coordinates further includes generating non-curvilinear orthonormal vectors from a helix defined in the rectangular coordinates.

At action 508, at least one filter is applied to the set of curvilinear coordinates to obtain filtered curvilinear motion data for the control object's movement path. In one implementation, at least a moving average filter is applied to the set of curvilinear coordinates to obtain filtered curvilinear motion data for the control object's movement path. In another implementation, at least a weight average filter is applied to the set of curvilinear coordinates to obtain filtered curvilinear motion data for the control object's movement path.

At action 510, a smoothened representation of the control object's movement path is generated for display based on the filtered curvilinear motion data. In one implementation, generating for display a smoothened representation of the object's motion path further includes approximating a best-fit curve that predicts a trajectory of the object and connects points along the object's non-linear motion path. In another implementation, generating for display a smoothened representation of the object's motion path further includes constructing an Euler spiral to model boundary segments between extrema of the object's non-linear motion path.

This method and other implementations of the technology disclosed can include one or more of the following features and/or features described in connection with additional methods disclosed. Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

Some implementations of method 500 include using the Frenet-Serret coordinates to determine orientation invariant trajectory of the control object along the control object's movement path during the non-linear free-form gesture.

Every free-form gesture can have a slight curve to its 3D trajectory, albeit sometimes imperceptibly so, and therefore curvature and torsion parameters corresponding to a reference Frenet-Serret frame's movement over time can be used to model this motion. A straight line of motion can also be modeled using a large number of Frenet-Serret frames such that the torsion parameter is zero, or approximately zero, and the curvature parameter of each frame cancels out the curvature parameter of the frame directly before and after it. The more frames that are used, the better the straight line will be represented.

Implementations of the technology disclosed can be employed in a variety of application areas, such as for example and without limitation consumer applications including interfaces for computer systems, laptops, tablets, television, game consoles, set top boxes, telephone devices and/or interfaces to other devices; medical applications including controlling devices for performing robotic surgery, medical imaging systems and applications such as CT, ultrasound, x-ray, MRI or the like, laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigations systems control, on-board entertainment systems control and/or environmental systems control; automotive applications including interfaces to automobile operational systems control, navigation systems control, on-board entertainment systems control and/or environmental systems control; security applications including, monitoring secure areas for suspicious activity or unauthorized personnel; manufacturing and/or process applications including interfaces to assembly robots, automated test apparatus, work conveyance devices such as conveyors, and/or other factory floor systems and devices, genetic sequencing machines, semiconductor fabrication related machinery, chemical process machinery and/or the like; and/or combinations thereof.

Implementations of the technology disclosed can further be mounted on automobiles or other mobile platforms to provide information to systems therein as to the outside environment (e.g., the positions of other automobiles). Further implementations of the technology disclosed can be used to track the motion of objects in a field of view or used in conjunction with other mobile-tracking systems. Object tracking can be employed, for example, to recognize gestures or to allow the user to interact with a computationally rendered environment; see, e.g., U.S. patent application Ser. Nos. 61/752,725 (filed on Jan. 15, 2013) and 13/742,953 (filed on Jan. 16, 2013), the entire disclosures of which are hereby incorporated by reference.

It should also be noted that implementations of the technology disclosed can be provided as one or more computer-readable programs embodied on or in one or more articles of manufacture. The article of manufacture can be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs can be implemented in any programming language. Some examples of languages that can be used include C, C++, or JAVA. The software programs can be further translated into machine language or virtual machine instructions and stored in a program file in that form. The program file can then be stored on or in one or more of the articles of manufacture.

Certain implementations of the technology disclosed were described above. It is, however, expressly noted that the technology disclosed is not limited to those implementations, but rather the intention is that additions and modifications to what was expressly described herein are also included within the scope of the technology disclosed. For example, it can be appreciated that the techniques, devices and systems described herein with reference to examples employing light waves are equally applicable to methods and systems employing other types of radiant energy waves, such as acoustical energy or the like. Moreover, it is to be understood that the features of the various implementations described herein were not mutually exclusive and can exist in various combinations and permutations, even if such combinations or permutations were not made express herein, without departing from the spirit and scope of the technology disclosed. In fact, variations, modifications, and other implementations of what was described herein will occur to those of ordinary skill in the art without departing from the spirit and the scope of the technology disclosed. As such, the technology disclosed is not to be defined only by the preceding illustrative description.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of accurately capturing a non-linear gestural path of a hand-gesture in three-dimensional (3D) sensory space, the method including:
    capturing with a camera a sequence of multiple images of a user's hand making a non-linear free-form hand-gesture performed by the user's hand, moving freely and substantially independently of contact with other objects in a three-dimensional (3D) sensory space monitored by the camera;
    using a first coordinate system associated with the camera, determining from the sequence of multiple images a first set of coordinates of a plurality of 3D positions along a hand-gesture movement path made by the user's hand during the non-linear free-form hand-gesture captured;
    determining an orientation invariant trajectory for the hand-gesture movement path during the non-linear free-form hand-gesture by transforming the first set of coordinates of the plurality of 3D positions along the hand-gesture movement path captured in the first coordinate system into a second set of coordinates in a second coordinate system according to a transform defining a relationship between the first coordinate system and the second coordinate system, including:
        transforming points in the images captured representing positions in space of portions of the user's hand captured using the first coordinate system corresponding to coordinates of the camera into corresponding points using the second coordinate system by attaching to select ones of the points a frame of reference consisting of an orthonormal vector set and
        building a sequence of orthonormal vector sets at sequential points of the select ones of the points thereby describing motion of the user's hand at the select ones of the points as the sequence of orthonormal vector sets;
    applying at least one filter to the second set of coordinates to obtain filtered curvilinear motion data for the hand-gesture movement path;
    comparing the orientation invariant trajectory for the hand-gesture movement path to a library of known gestures electronically stored as records in a database to detect a gesture; and when a similar trajectory for a user's hand located in the library of known gesture is found, providing a command input to control a system based upon the gesture detected; and
    generating for display a smoothened representation of the hand-gesture movement path using an approximate best-fit curve that predicts a trajectory for the user's hand by connecting points along the hand-gesture movement path.

2. The method of claim 1, further including:
    recognizing a second hand-gesture as corresponding to a recording of the hand-gesture movement path by:
        determining an orientation invariant trajectory of a second hand-gesture movement path of the second hand-gesture; and
        matching the orientation invariant trajectory of the second hand-gesture movement path to the orientation invariant trajectory of the hand-gesture movement path; thereby eliminating from consideration translation or rotation of the second hand-gesture relative to the recording of the hand-gesture movement path.

3. The method of claim 1, further including using the command input to control and interact with computer systems by moving fingers in air.

4. The method of claim 1, further including using the command input to perform free-floating handwriting recognition.

5. The method of claim 4, the free-floating handwriting recognition further including applying the smoothed representation to disambiguate between similarly shaped trajectories of handwriting characters in the 3D sensory space.

6. The method of claim 1, further including the hand holding a stylus.

7. The method of claim 1, wherein the orthonormal vector set includes: a tangent unit vector that is tangent to the hand-gesture movement path and pointing in a direction of motion of the user's hand at a corresponding point, a normal unit vector that is derivative of the tangent unit vector with respect to an arclength of at least a portion of the hand-gesture movement path divided by a length of the at least a portion of the hand-gesture movement path, and a binormal unit vector comprising a cross product of the tangent unit vector and the normal unit vector.

8. The method of claim 1, further including associating a frame of reference with at least two locations along the hand-gesture movement path and having no corresponding point in the images captured.

9. The method of claim 8, further including distributing the at least two locations evenly along the hand-gesture movement path.

10. The method of claim 8, further including distributing additional frames of reference at locations along the hand-gesture movement path in which the hand-gesture movement path changes direction more rapidly than at any other points in the hand-gesture movement path.

11. The method of claim 1, further including:
    determining a curvature and a torsion of the hand-gesture movement path from a rotation between two consecutive ones of the sequence of orthonormal vector sets for the select ones of the points along the hand-gesture movement path; and
    removing from the hand-gesture movement path, points indicated by the curvature and torsion to correspond to unintended motion; thereby creating a resultant hand-gesture movement path.

12. The method of claim 11, further including:
    replacing points removed from the hand-gesture movement path with a curve defined by Euler's spiral fitted to the hand-gesture movement path in the second coordinate system; and
    transforming the hand-gesture movement path back to the first coordinate system.

13. The method of claim 12, further including:
    fitting a spiral having a curvature near zero at a tangent portion and increasing linearly with its curve length such that when the spiral meets a circular portion of the hand-gesture movement path, curvature of the spiral is equal to curvature of the hand-gesture movement path.

14. The method of claim 11, further including:
using the resultant hand-gesture movement path, predicting an intended free-form hand-gesture for a user before the non-linear free-form hand-gesture has been completed.

15. The method of claim 1, further including constructing for display an Euler spiral to model boundary segments between at least a first extreme and a second extreme of the hand-gesture movement path.

16. A non-transitory computer readable medium storing instructions to accurately capture a non-linear gestural path of a hand-gesture in three-dimensional (3D) sensory space, which instructions when executed by a processor perform actions including:
  capturing with a camera a sequence of multiple images of a user's hand making a non-linear free-form hand-gesture performed by the user's hand, moving freely and substantially independently of contact with other objects in a three-dimensional (3D) sensory space monitored by the camera;
  using a first coordinate system associated with the camera, determining from the sequence of multiple images a first set of coordinates of a plurality of 3D positions along a hand-gesture movement path made by the user's hand during the non-linear free-form hand-gesture captured;
  determining an orientation invariant trajectory for the hand-gesture movement path during the non-linear free-form hand-gesture by transforming the first set of coordinates of the plurality of 3D positions along the hand-gesture movement path captured in the first coordinate system into a second set of coordinates in a second coordinate system according to a transform defining a relationship between the first coordinate system and the second coordinate system, including:
    transforming points in the images captured representing positions in space of portions of the user's hand captured using the first coordinate system corresponding to coordinates of the camera into corresponding points using the second coordinate system by attaching to select ones of the points a frame of reference consisting of an orthonormal vector set and
    building a sequence of orthonormal vector sets at sequential points of the select ones of the points thereby describing motion of the user's hand at the select ones of the points as the sequence of orthonormal vector sets;
  applying at least one filter to the second set of coordinates to obtain filtered curvilinear motion data for the hand-gesture movement path; and
  comparing the orientation invariant trajectory for the hand-gesture movement path to a library of known gestures electronically stored as records in a database to detect a gesture; and when a similar trajectory for a user's hand located in the library of known gesture is found, providing a command input to control a system based upon the gesture detected; and
  generating for display a smoothened representation of the hand-gesture movement path using an approximate best-fit curve that predicts a trajectory for the user's hand by connecting points along the hand-gesture movement path.

17. A system of accurately capturing non-linear gestural path of a hand-gesture in three-dimensional (3D) sensory space, the system including:
  at least one camera to capture a sequence of multiple images of a user's hand making a non-linear free-form gesture performed by the user's hand, moving freely and substantially independently of contact with other objects in a three-dimensional (3D) sensory space monitored by the camera;
  a processor;
  a processor-executable object-detection model to determine from the sequence of multiple images a first set of coordinates of a plurality of 3D positions along a hand-gesture movement path made by the user's hand during a non-linear free-form hand-gesture captured using a first coordinate system associated with the camera;
  a processor-executable filtering module to:
  determine an orientation invariant trajectory for the hand-gesture movement path by transforming the first set of coordinates of the plurality of 3D positions along the hand-gesture movement path captured in the first coordinate system into a second set of coordinates in a second coordinate system according to a transform defining a relationship between the first coordinate system and the second coordinate system, including:
    transforming points in the images captured representing positions in space of portions of the user's hand captured using the first coordinate system corresponding to coordinates of the camera into corresponding points using the second coordinate system by attaching to select ones of the points a frame of reference consisting of an orthonormal vector set and
    building a sequence of orthonormal vector sets at sequential points of the select ones of the points thereby describing motion of the user's hand at the select ones of the points as the sequence of orthonormal vector sets;
  apply at least one filter to the second set of coordinates to obtain filtered curvilinear motion data for the hand-gesture movement path; and
  compare the orientation invariant trajectory for the hand-gesture movement path to a library of known gestures electronically stored as records in a database to detect a gesture; and when a similar trajectory for a user's hand located in the library of known gesture is found, providing a command input to control a system based upon the gesture detected; and
  generate for display a smoothened representation of the hand-gesture movement path using an approximate best-fit curve that predicts a trajectory for the user's hand by connecting points along the hand-gesture movement path.

* * * * *